United States Patent
Vintola et al.

(10) Patent No.: US 11,026,189 B2
(45) Date of Patent: Jun. 1, 2021

(54) SOUNDING REFERENCE SIGNAL (SRS) TRANSMISSION PROTOCOL

(71) Applicant: QUALCOMM Incorporated, San Diego, CA (US)

(72) Inventors: Timo Ville Vintola, San Diego, CA (US); Peter Gaal, San Diego, CA (US); Alberto Rico Alvarino, San Diego, CA (US); Yi Huang, San Diego, CA (US); Vishal Mahajan, Newark, CA (US); Andrew Puayhoe See, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/011,261

(22) Filed: Jun. 18, 2018

(65) Prior Publication Data

US 2018/0368078 A1 Dec. 20, 2018

Related U.S. Application Data

(60) Provisional application No. 62/556,740, filed on Sep. 11, 2017, provisional application No. 62/521,864, filed on Jun. 19, 2017.

(51) Int. Cl.
*H04W 52/32* (2009.01)
*H04B 7/06* (2006.01)
(Continued)

(52) U.S. Cl.
CPC ........ *H04W 52/325* (2013.01); *H04B 7/0608* (2013.01); *H04L 5/0007* (2013.01);
(Continued)

(58) Field of Classification Search
CPC ........... H04W 52/00–60; Y02D 70/324; Y02D 70/326
(Continued)

(56) References Cited

U.S. PATENT DOCUMENTS 9,900,849 B2 * 2/2018 Xu ........................ H04W 52/325
2010/0285762 A1 * 11/2010 Ko ......................... H04L 5/0023
455/127.1
(Continued)

FOREIGN PATENT DOCUMENTS

EP 3209069 A1 8/2017
WO 2016017705 A1 2/2016

OTHER PUBLICATIONS

International Search Report and Written Opinion—PCT/US2018/038220—ISA/EPO—dated Sep. 18, 2018.
(Continued)

*Primary Examiner* — Raymond S Dean
(74) *Attorney, Agent, or Firm* — Patterson + Sheridan, LLP

(57) ABSTRACT

Certain aspects of the present disclosure relate to methods and apparatus for wireless communication. In certain aspects, the method generally includes determine a transmission power for each of at least one first sounding reference signal (SRS) to be transmitted using at least one first antenna, wherein the determination is based on whether the at least one first SRS is transmitted using an amplifier of a transmit chain configured for transmissions using a second antenna, and transmitting the at least one first SRS based on the determination.

17 Claims, 14 Drawing Sheets

(51) Int. Cl.
 *H04L 5/00* (2006.01)
 *H04W 52/14* (2009.01)
 *H04W 52/44* (2009.01)

(52) U.S. Cl.
 CPC ............ *H04L 5/0048* (2013.01); *H04L 5/001* (2013.01); *H04W 52/146* (2013.01); *H04W 52/44* (2013.01)

(58) Field of Classification Search
 USPC .................................................. 455/69, 522
 See application file for complete search history.

(56) References Cited

U.S. PATENT DOCUMENTS

| 2012/0121031 | A1* | 5/2012 | Tang ...................... H04B 7/046 375/267 |
| 2012/0142392 | A1* | 6/2012 | Patel ................... H04W 52/143 455/522 |
| 2014/0050182 | A1* | 2/2014 | Iwai .................... H04W 52/325 370/329 |
| 2014/0133449 | A1* | 5/2014 | Xu ...................... H04W 52/367 370/329 |
| 2018/0359077 | A1* | 12/2018 | Haine .................. H04B 7/0817 |
| 2019/0109732 | A1* | 4/2019 | Choi ................. H04W 72/0453 |

OTHER PUBLICATIONS

Mitsubishi Electric: "SRS Assignment for UL MIMO," 3GPP Draft; R1-104873, 3rd Generation Partnership Project (3GPP), Mobile Competence Centre; 650, Route Des Lucioles; F-06921 Sophia-Antipolis Cedex; France, vol. Ran WG1, No. Madrid, Spain; Aug. 23, 2010, Aug. 17, 2010, XP050450033, 4 pages, [retrieved on Aug. 17, 2010].

RAN WG1: "LS related to SRS hopping," 3GPP Draft; R1-1709836, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 20, 2017, XP051285661, p. 1, Retrieved from the Internet: URL: http://www.3gpp.org/ftp/tsg_ran/WG1_RL1/TSGR1_89/LS/Outgoing/ [retrieved on May 20, 2017].

* cited by examiner

SOUNDING REFERENCE SIGNAL (SRS) TRANSMISSION PROTOCOL

CROSS-REFERENCE TO RELATED APPLICATIONS

This application claims benefit of U.S. Provisional Patent Application Ser. No. 62/556,740, filed Sep. 11, 2017, and U.S. Provisional Patent Application Ser. No. 62/521,864, filed Jun. 19, 2017, which are expressly incorporated herein by reference in their entirety.

FIELD

The present disclosure relates generally to communication systems, and more particularly, to methods and apparatus for performing sounding operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication. The method generally includes determining a transmission power for each of at least one first sounding reference signal (SRS) to be transmitted using at least one first antenna, wherein the determination is based on whether the at least one first SRS is transmitted using an amplifier of a transmit chain configured for transmissions using a second antenna, and transmitting the at least one first SRS based on the determination.

Certain aspects of the present disclosure provide a method for wireless communication. The method generally includes determining whether a user-equipment (UE) is to compensate for a power loss associated with transmitting at least one first SRS via at least one first antenna using an amplifier of a transmit chain configured for transmissions using a second antenna, transmitting, to the UE, a first indication of whether the UE is to compensate for the power loss, based on the determination, and receiving, from the UE, the at least one first SRS after transmitting the first indication.

Certain aspects of the present disclosure provide an apparatus for wireless communication. The apparatus generally includes a processing system configured to determine a transmission power for each of at least one first SRS to be transmitted using at least one first antenna, wherein the determination is based on whether the at least one first SRS is transmitted using an amplifier of a transmit chain configured for transmissions using a second antenna, and a transmitter configured to transmit the at least one first SRS based on the determination.

Certain aspects of the present disclosure provide an apparatus for wireless communication. The apparatus generally includes a processing system configured to determine whether a UE is to compensate for a power loss associated with transmitting at least one first SRS via at least one first antenna using an amplifier of a transmit chain configured for transmissions using a second antenna, a transmitter configured to transmit, to the UE, a first indication of whether the UE is to compensate for the power loss, based on the determination, and a receiver configured to receive, from the UE, the at least one first SRS after transmitting the first indication.

Certain aspects of the present disclosure provide an apparatus for wireless communication. The apparatus generally includes means for determining a transmission power for each of at least one first SRS to be transmitted using at least one first antenna, wherein the determination is based on whether the at least one first SRS is transmitted using an amplifier of a transmit chain configured for transmissions using a second antenna, and means for transmitting the at least one first SRS based on the determination.

Certain aspects of the present disclosure provide an apparatus for wireless communication. The apparatus generally includes means for determining whether a UE is to compensate for a power loss associated with transmitting at least one first SRS via at least one first antenna using an amplifier of a transmit chain configured for transmissions using a second antenna, means for transmitting, to the UE, a first indication of whether the UE is to compensate for the power loss, based on the determination, and means for receiving, from the UE, the at least one first SRS after transmitting the first indication.

Certain aspects of the present disclosure provide a computer-readable medium having instructions stored thereon for determining a transmission power for each of at least one first SRS to be transmitted using at least one first antenna, wherein the determination is based on whether the at least one first SRS is transmitted using an amplifier of a transmit chain configured for transmissions using a second antenna, and transmitting the at least one first SRS based on the determination.

Certain aspects of the present disclosure provide a computer-readable medium having instructions stored thereon for determining whether a UE is to compensate for a power loss associated with transmitting at least one first SRS via at least one first antenna using an amplifier of a transmit chain configured for transmissions using a second antenna, transmitting, to the UE, a first indication of whether the UE is to compensate for the power loss, based on the determination, and receiving, from the UE, the at least one first SRS after transmitting the first indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
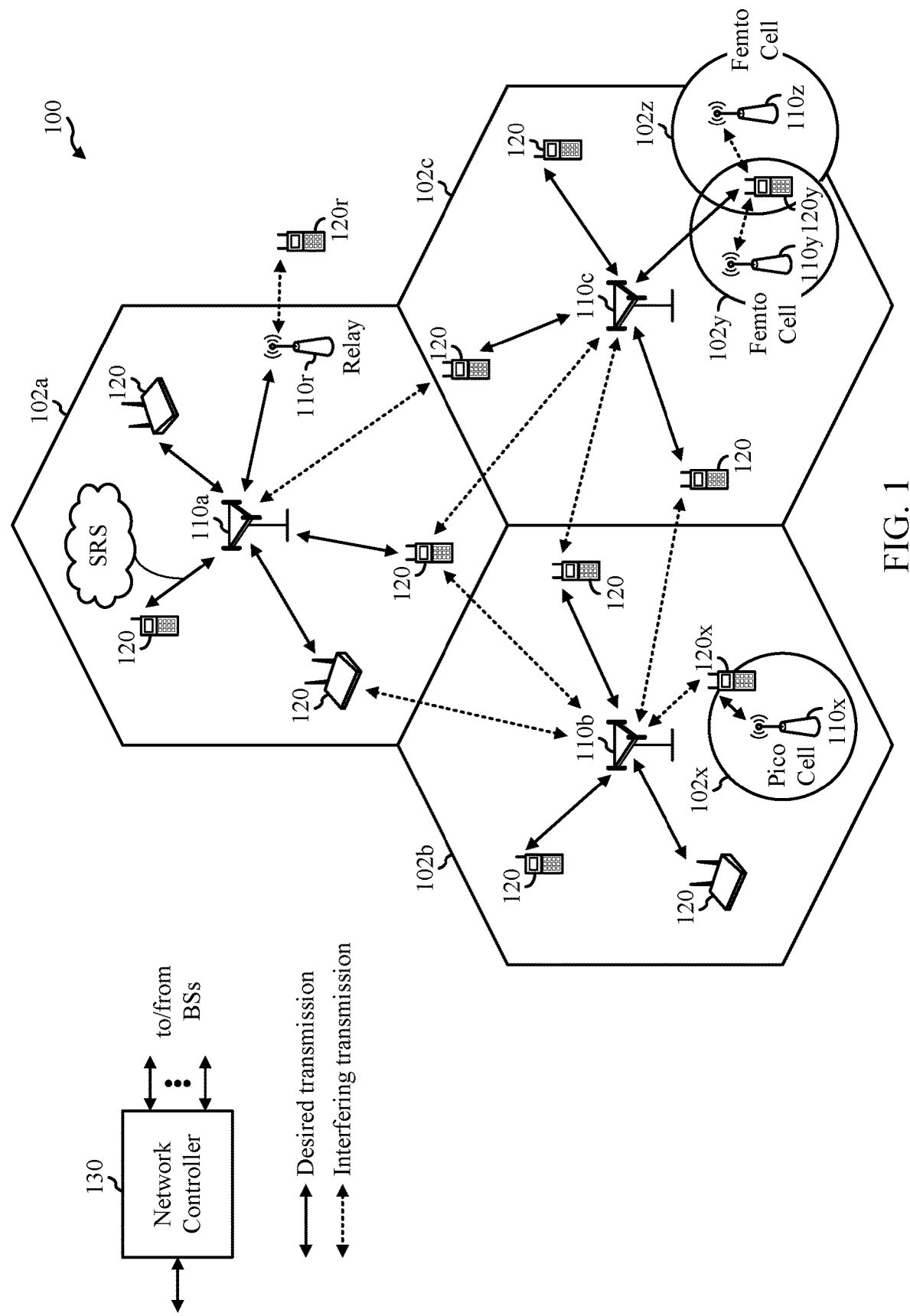
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5 G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink (DL) and/or uplink (UL). A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
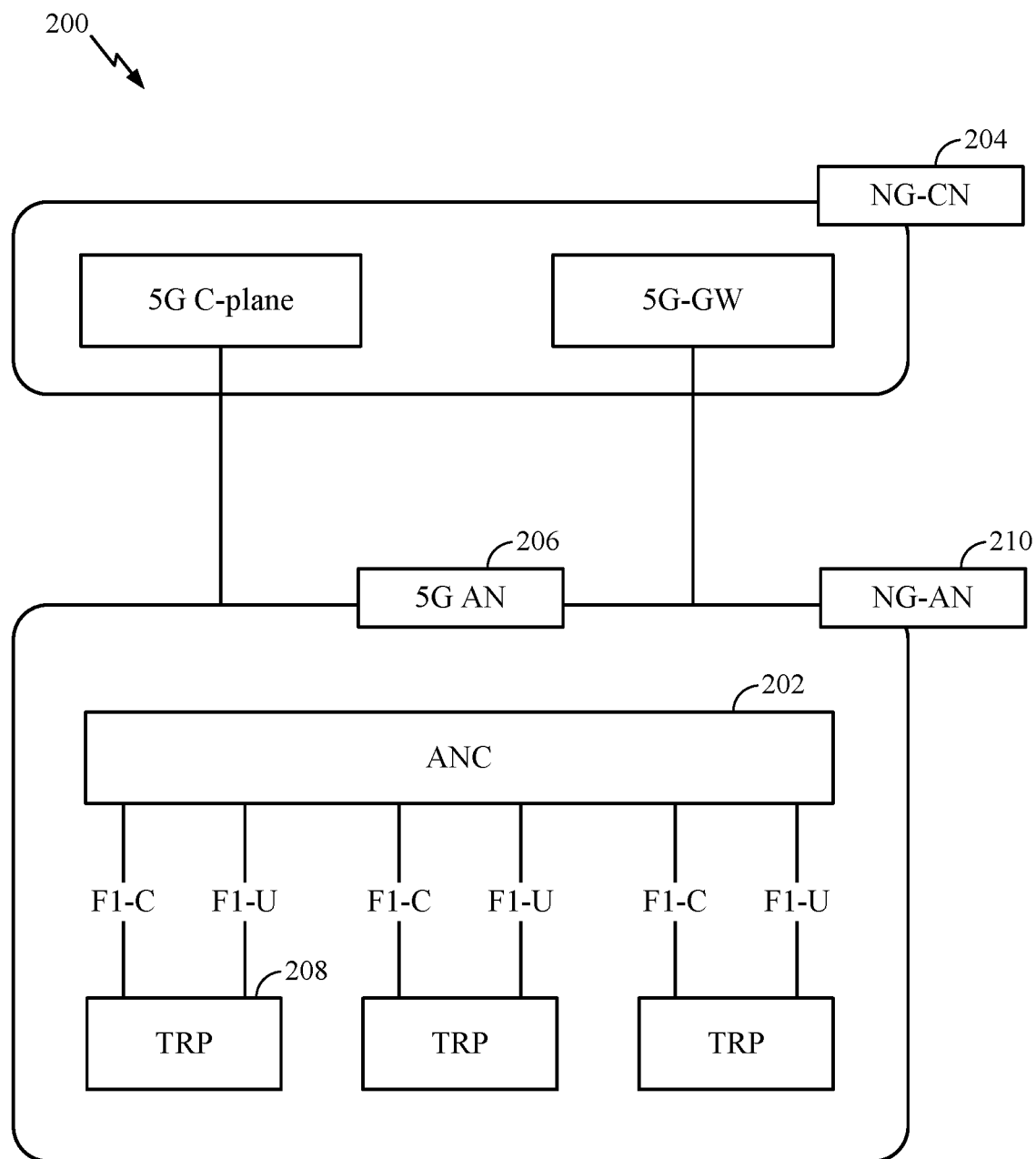
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
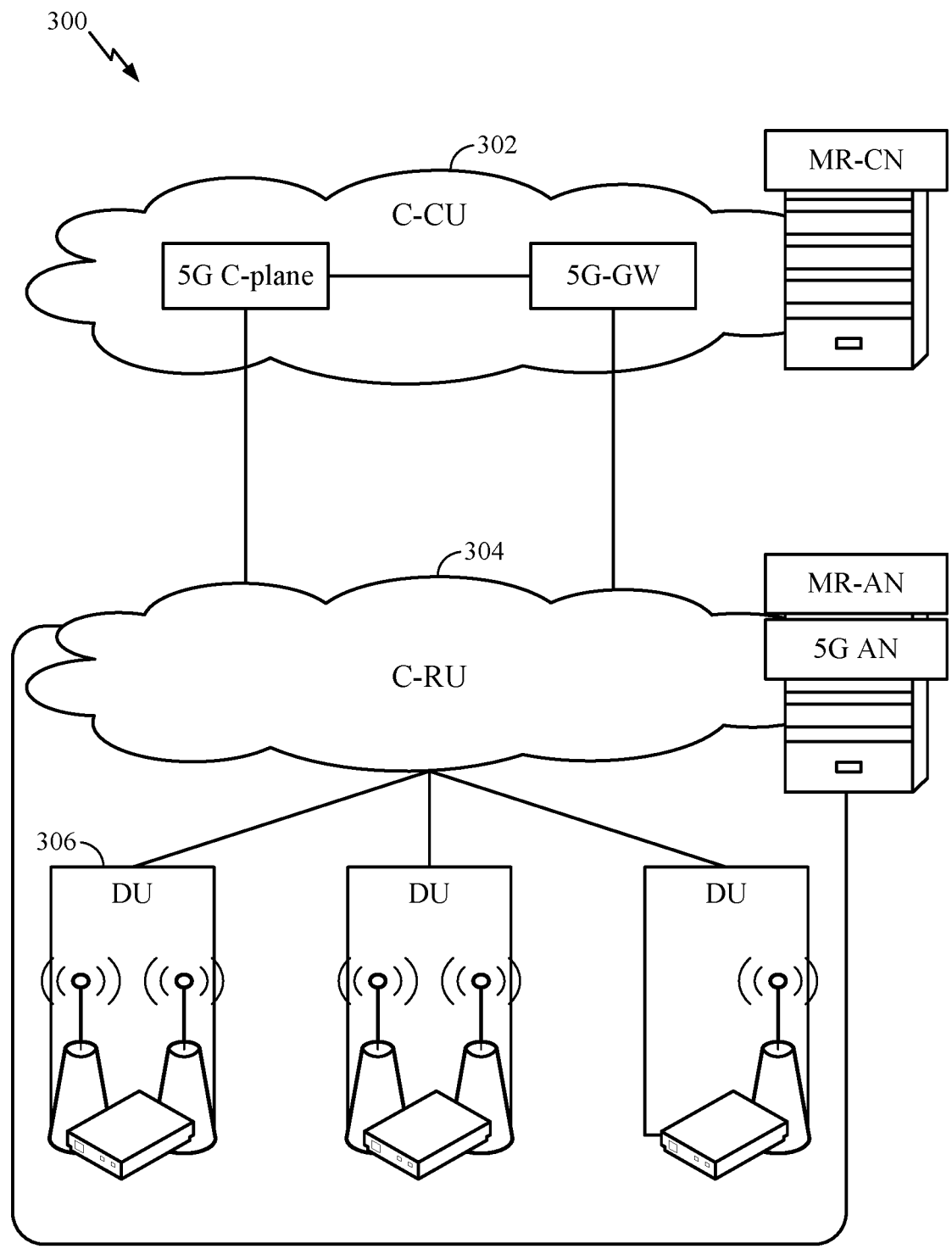
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
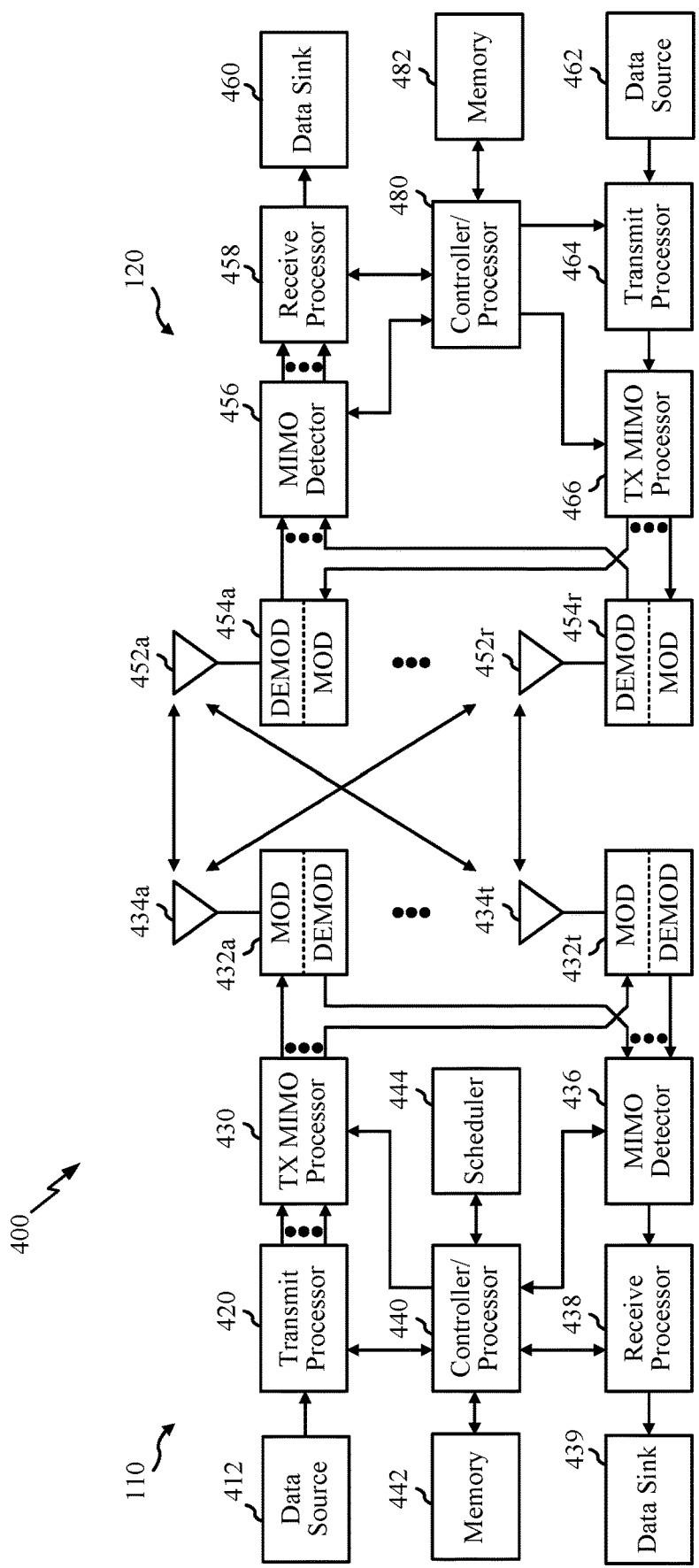
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 420, 438, and/or controller/processor 440 of the BS 110 may be used to perform the operations described herein and illustrated with reference to FIGS. 8, and 9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
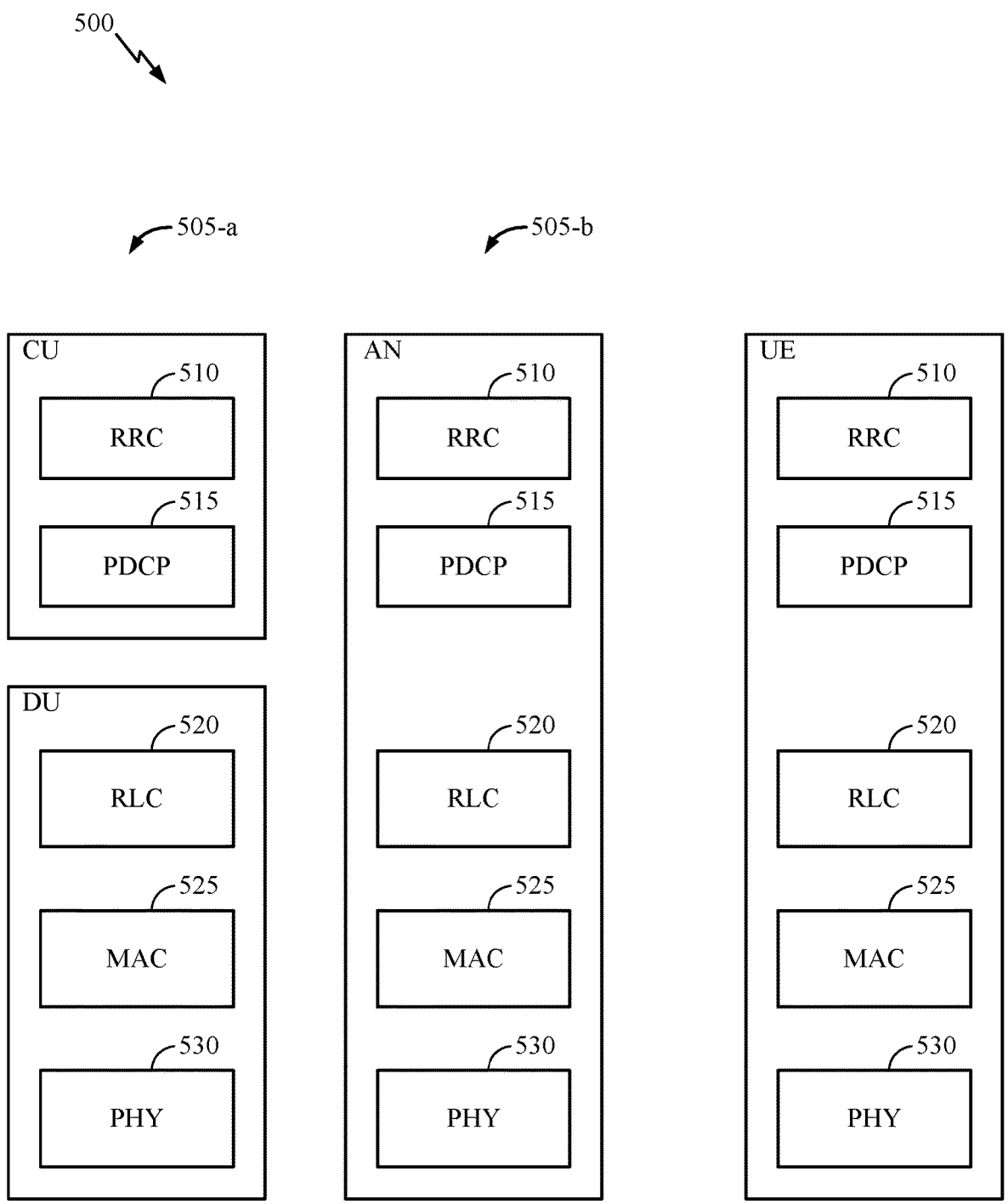
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device. In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
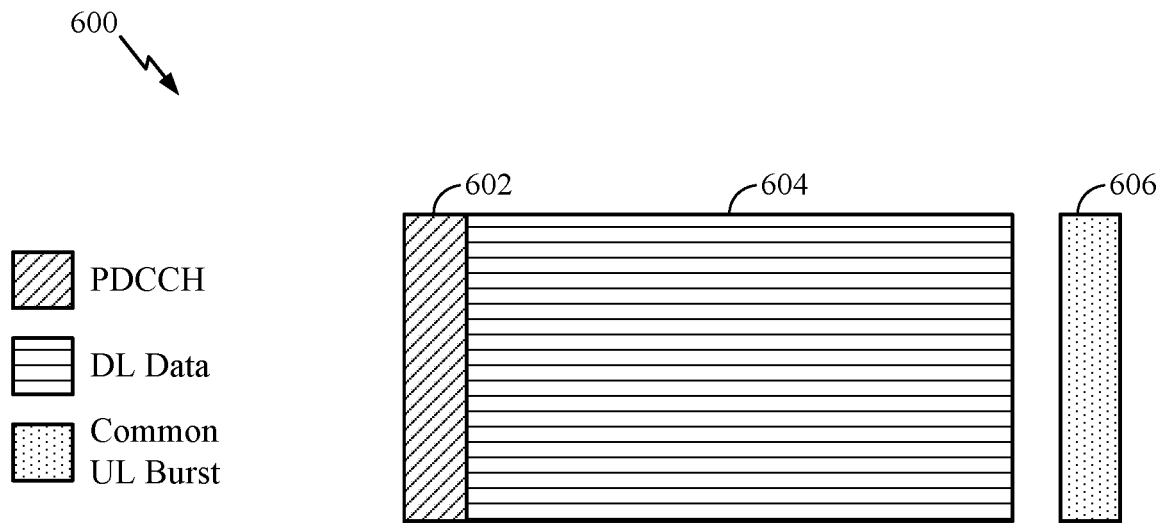
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
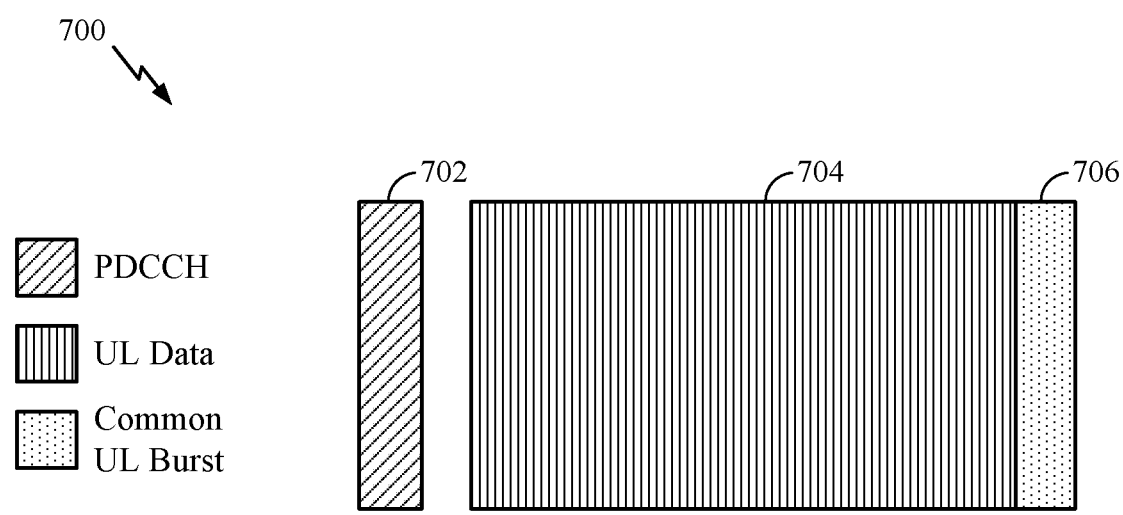
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6.

The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example of LTE-NR Dual Connectivity

Presently, mobiles devices typically receive data from a single TRP. However, users may experience a poor connection resulting in reduced data throughput, delay, increased battery usage, and other drawbacks. For example, users may be on a cell edge and may experience high inter-cell interference which may limit the data rates. In another example, users may experience scenarios were additional communication capacities would be beneficial. Accordingly, dual connectivity (DC) allows users to transmit and receive data from multiple TRPs independently and/or simultaneously. For example, the UE may send and receive data from two TRPs in two separate streams when the UE is in range of two cell towers in two adjacent cells at the same time. The UE may communicate with the two towers simultaneously when the UE is within either towers' reach. By scheduling two independent data streams to the UE from two different TRPs at the same time, dual connectivity (DC) may exploit network capacities. Further, in another example, the UE may select one of the two TRPs to communicate with depending on the requirements of the UE. This helps improve the user experience while increasing network capacity.

Accordingly, dual connectivity (DC) may have benefits in the cellular industry. For example, DC can significantly improve per-user throughput and mobility robustness by allowing users to be connected simultaneously to an eNB and a gNB. The increase in per-user throughput is achieved by aggregating radio resources from at least two NBs. Moreover, dual connectivity also helps in load balancing between the eNB and the gNB. Further, presently in 5G deployment, an LTE-NR tight interworking architecture with dual connectivity (DC) may be used to avoid areas where NR does not have ubiquitous coverage.

Example Techniques for Channel Sounding on Downlink Antennas

A sounding reference signal (SRS) is a reference signal transmitted by a UE in the uplink direction. The SRS may be used by the base station (e.g., gNB or eNB) to estimate the uplink channel quality. The base station (BS) may use this information to schedule uplink frequency resources for the UE. Certain aspects of the present disclosure are generally directed to techniques for transmitting SRSs for the BS to estimate a channel. For example, the SRSs may be transmitted by the UE via different antennas (e.g., downlink (DL) antennas) and using one or more transmit chains of the UE.

In certain aspects, a special SRS slot (or a mini-slot) may be used to sound multiple (e.g., four) DL channels by sending reference symbols from the UE to the BS. The slot structure may be the same for all subcarrier spacing (SCS), but may be different if the SRS is shorter than the full symbol.

Certain aspects of the present disclosure provide different configurations for transmission of SRS for different UE capabilities. For example, some UEs may have a single transmitter (e.g., a single power amplifier (PA)), indicated by a rank one transmission capability, some UEs may have two transmitters, indicated by a rank two transmission capability, and some UEs may have four transmitters, indicated by a rank three transmission capability. For example, with two transmitters, two antennas may be sounded simultaneously, and with four transmitters, four antennas may be sounded simultaneously.

Figure 8:
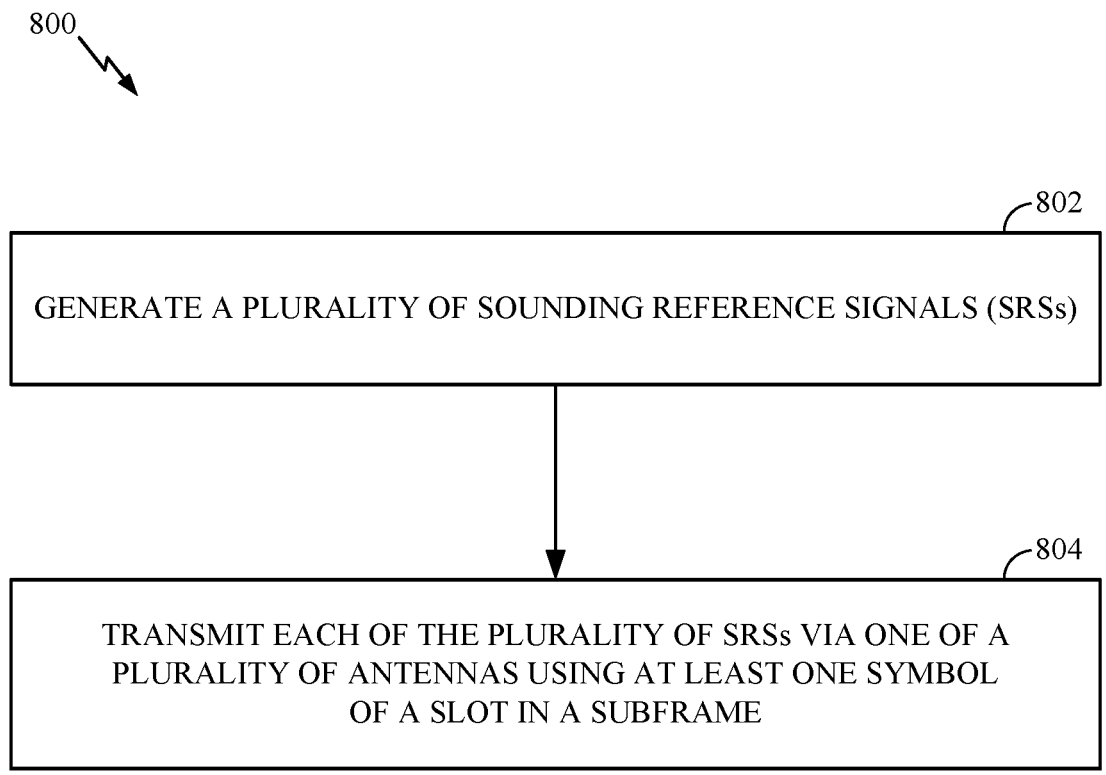
FIG. 8 illustrates example operations for wireless communication by a UE, in accordance with aspects of the present disclosure.

FIG. 8 illustrates example operations 800 for wireless communication, in accordance with certain aspects of the present disclosure. The operations 800 may be performed by a UE, such as the UE 120 of FIG. 1.

The operations 800 begin, at block 802, by generating a plurality of SRSs, and at block 804, transmitting each of the plurality of SRSs via one of a plurality of antennas using at least one symbol of a slot in a subframe.

Figure 9:
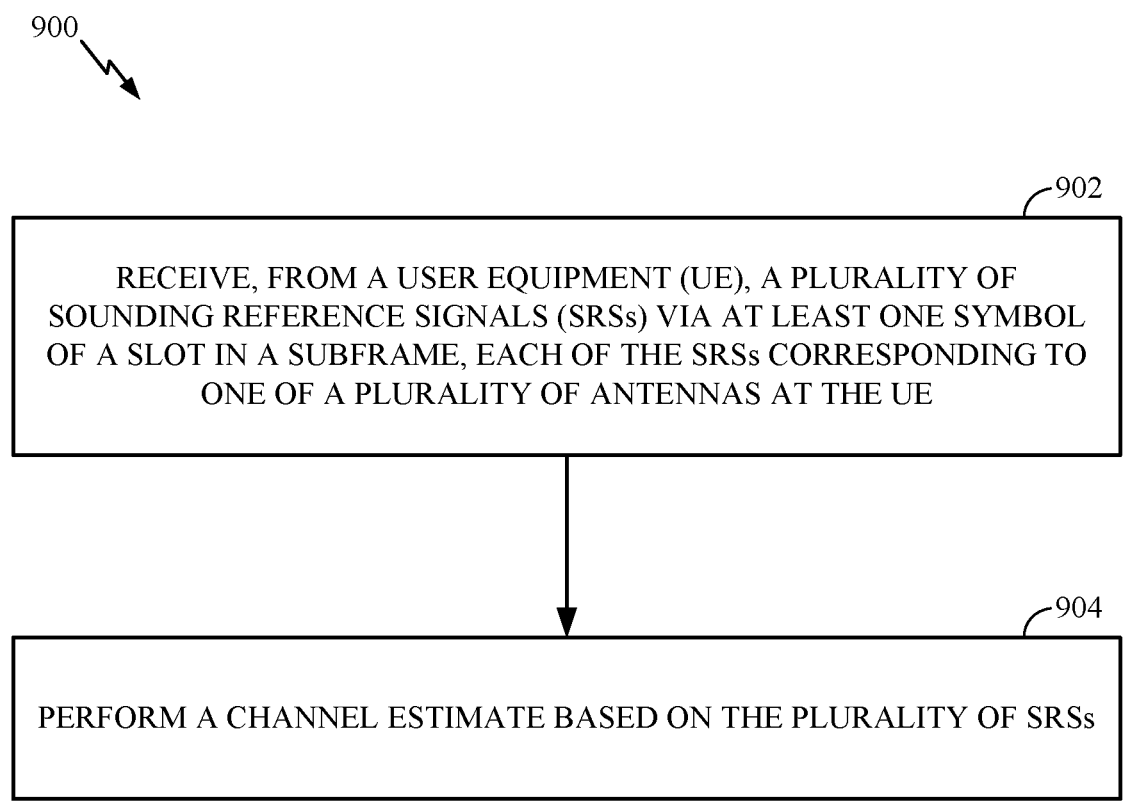
FIG. 9 illustrates example operations for wireless communication by a base station (BS), in accordance with aspects of the present disclosure.

FIG. 9 illustrates example operations 900 for wireless communication, in accordance with certain aspects of the present disclosure. The operations 900 may be performed by a network entity, such as the BS 110 of FIG. 1.

The operations 900 begin, at block 902, by receiving, from a UE (e.g., UE 120), a plurality of SRSs via at least one symbol of a slot in a subframe, each of the SRSs corresponding to one of a plurality of antennas at the UE, and at block 904, performing a channel estimate (e.g., MIMO sounding) based on the plurality of SRSs.

In certain aspects, the at least one symbol may include a plurality of symbols, and each of the plurality of SRSs may be transmitted using a different one of the plurality of symbols. For example, if the UE has a single PA (e.g., transmitter) and a 60 KHz subcarrier spacing is used, each SRS may be transmitted using different symbols with a gap (e.g., of one symbol) between the different symbols, allowing the transmit path to be routed to a different antenna between the SRS transmissions, as described in more detail with respect to FIG. 10.

Figure 10:
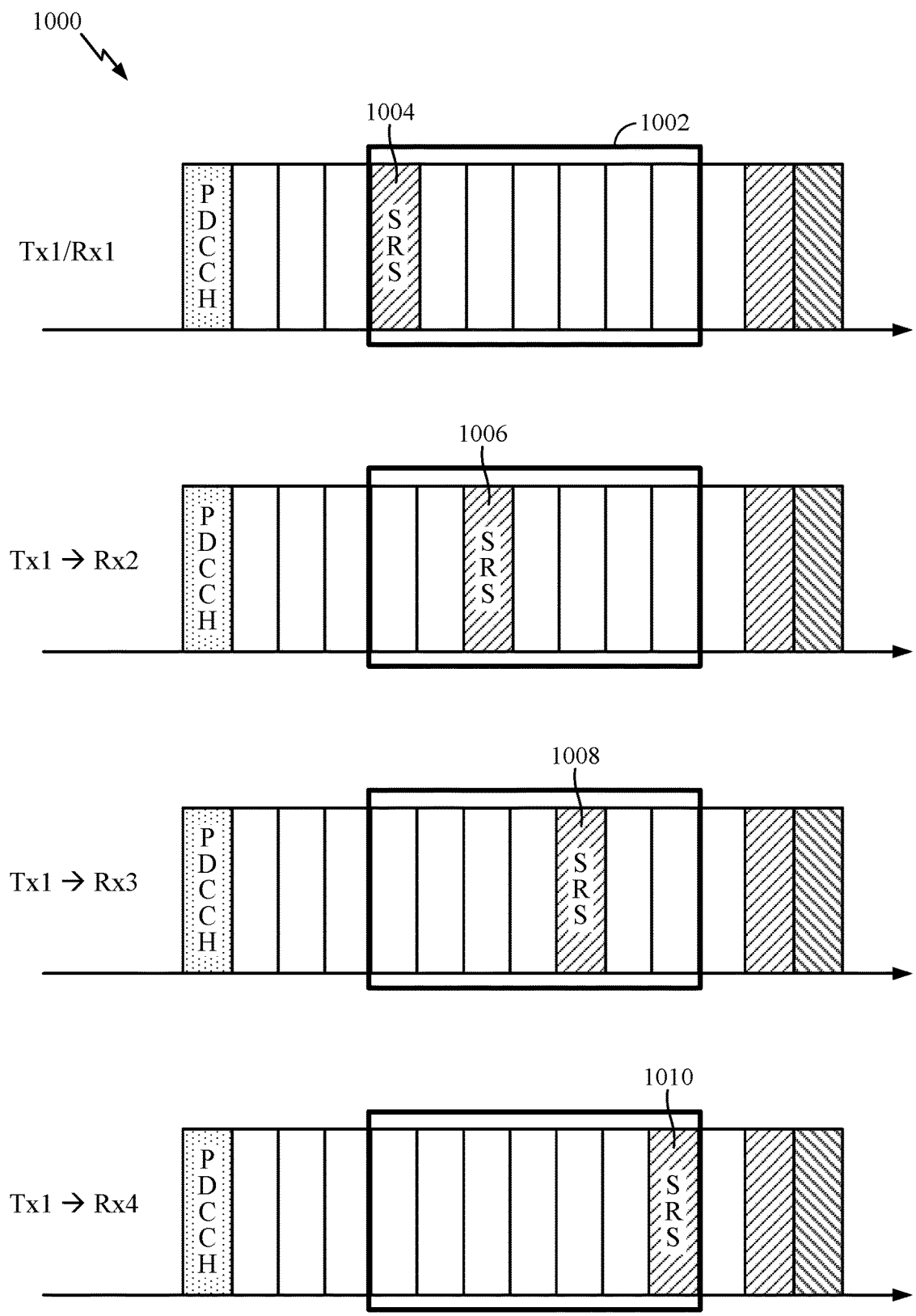
FIG. 10 illustrates a protocol for transmitting sounding reference signals SRSs via different antennas for a UE with a single transmitter, in accordance with certain aspects of the present disclosure.

FIG. 10 illustrates a protocol 1000 for transmitting SRS via different antennas (e.g., receiver (Rx) or DL antennas) for a UE having a single transmitter (e.g., a single PA), in accordance with certain aspects of the present disclosure. As illustrated, the protocol 1000 includes a slot 1002, having seven symbols, for transmitting SRSs. For example, a transmitter (Tx1) may be used to transmit SRS 1004 via a first receive antenna (Rx1) during a first symbol in the slot 1002. A transmit path coupled to Tx1 may be rerouted from Tx1 to a second receive antenna (Rx2), prior to transmitting a SRS 1006 via the second receive antenna Rx2. Therefore, one symbol gap may be present between the transmission of the SRS 1004 and the SRS 1006, as illustrated, allowing sufficient time for the rerouting (e.g., reconfiguring switches) of the transmit chain. For example, the symbol duration for a 60 KHz subcarrier spacing may be around 17.8 us, and time for rerouting the transmit chain (e.g., turning PA of the transmitter off, switching antennas by controlling one or more switches, and turning the PA on) may be around 15 us. As illustrated, the transmit chain may be rerouted to a third receive antenna (Rx3) for transmission of SRS 1008, and subsequently rerouted to a fourth receive antennas (Rx4) for transmission of SRS 1010 in a similar manner.

Figure 11:
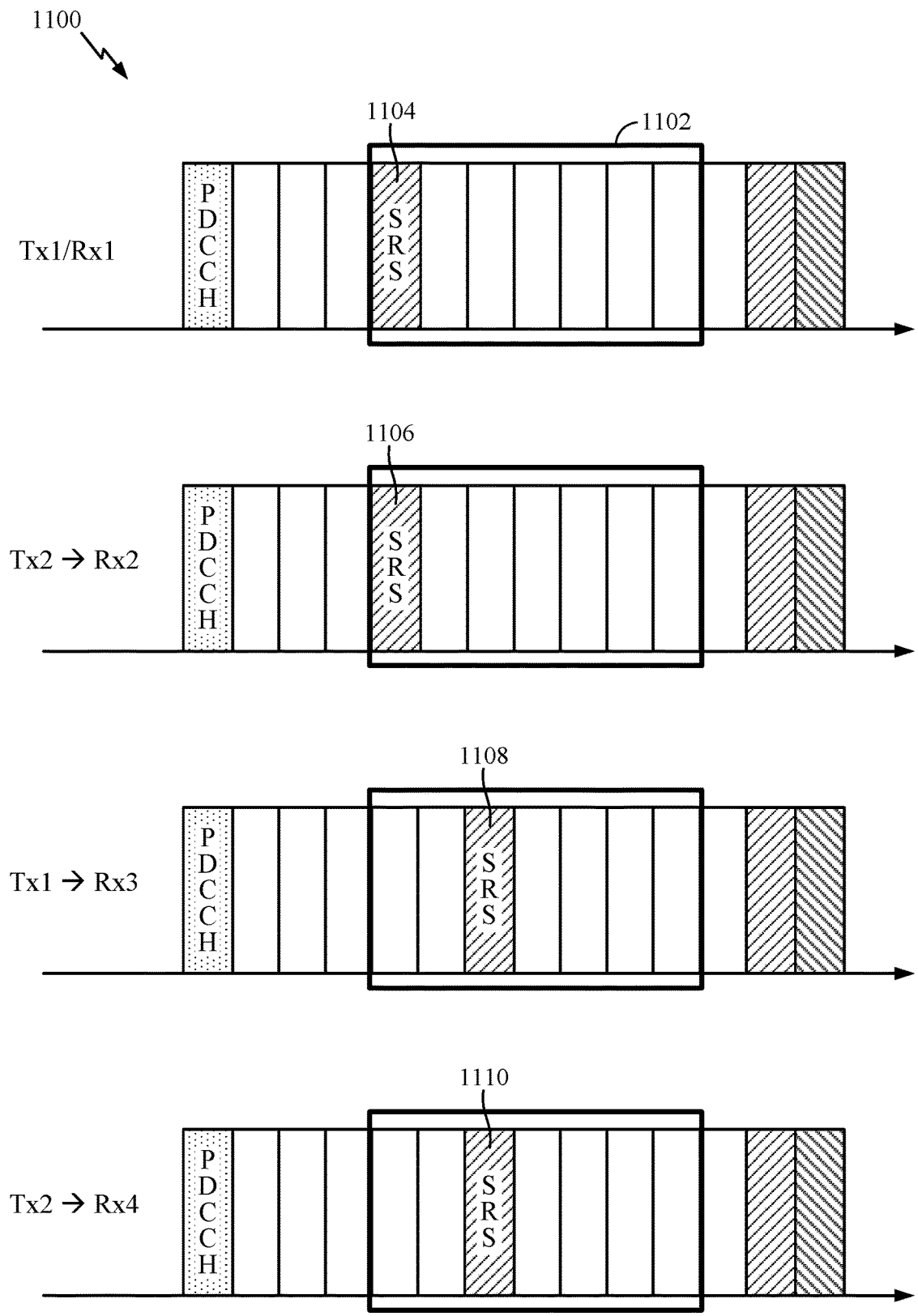
FIG. 11 illustrates a protocol for transmitting SRSs via different antennas for a UE with two transmitters, in accordance with certain aspects of the present disclosure.

FIG. 11 illustrates a protocol 1100 for transmitting SRS via different antennas (e.g., Rx or DL antennas) for a UE with two transmitters, in accordance with certain aspects of the present disclosure. As illustrated, the protocol 1100 includes a slot (e.g., including seven symbols), for transmitting SRSs. In certain aspects, a mini slot with fewer symbols may be designated for SRS transmissions.

As illustrated, a first transmitter (Tx1) may be used to transmit SRS 1104 via a first receive antenna (Rx1) during a first symbol in the slot 1102 and a second transmitter (Tx2) may be used to transmit SRS 1106 via a second receive antenna (Rx2) during the first symbol (e.g., simultaneously with the transmission of SRS 1104). Transmit paths coupled to Tx1 and Tx2 may then be rerouted from Tx1 to a third receive antenna (Rx3) and from Tx2 to a fourth receive antenna (Rx4), prior to the first transmitter transmitting a SRS 1108 via Rx3 and the second transmitter transmitting a SRS 1110 via Rx4. Therefore, one symbol gap may be present prior to the transmission of the SRSs 1108 and 1110, as illustrated, allowing sufficient time for the rerouting of the transmit chains.

In certain aspects, each of the transmitters Tx1 and Tx2 may transmit SRSs via different antennas during the same symbol. For example, is a 30 KHz subcarrier spacing is used, the symbol duration may be about 35.6 us (e.g., as opposed to only 17.8 us for a 60 KHz subcarrier spacing). This longer subcarrier spacing may provide sufficient time for the rerouting of the transmit path and transmission of SRSs via multiple antennas during the same symbol. For example, SRSs may be transmitted via two antennas if the number of tones required is less than half the symbol duration. In this case, two transmitters may transmit SRSs via four antennas in the same symbol. This is also possible for a case where the UE has four transmitters. For example, each transmitter may transmit an SRS using one of the four antennas simultaneously.

In certain aspects, the protocol 1100 may be used for UL MIMO. If UL MIMO is not configured, the network can either configure UL MIMO and then request SRS sequence transmission according to protocol 1100 or request SRS sequence transmission according to protocol 1000 described with respect to FIG. 10.

Figure 12A:
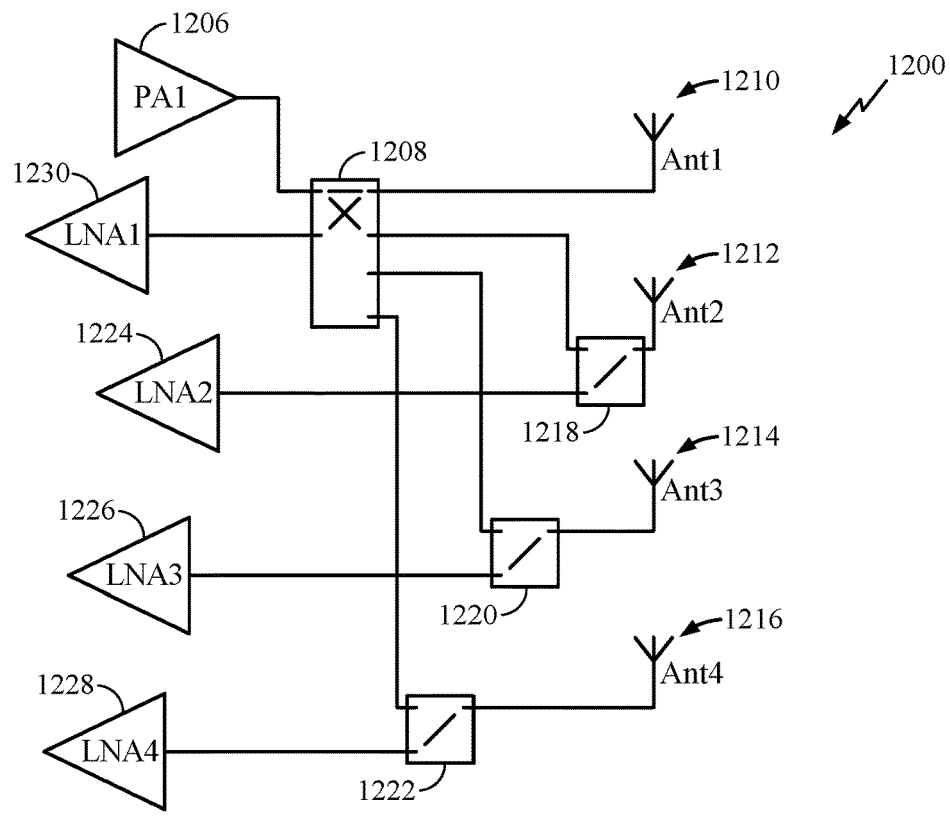
FIGS. 12A, 12B, and 12C illustrate examples of radio-frequency (RF) front-end circuitry, in accordance with certain aspects of the present disclosure.
Figure 12B:
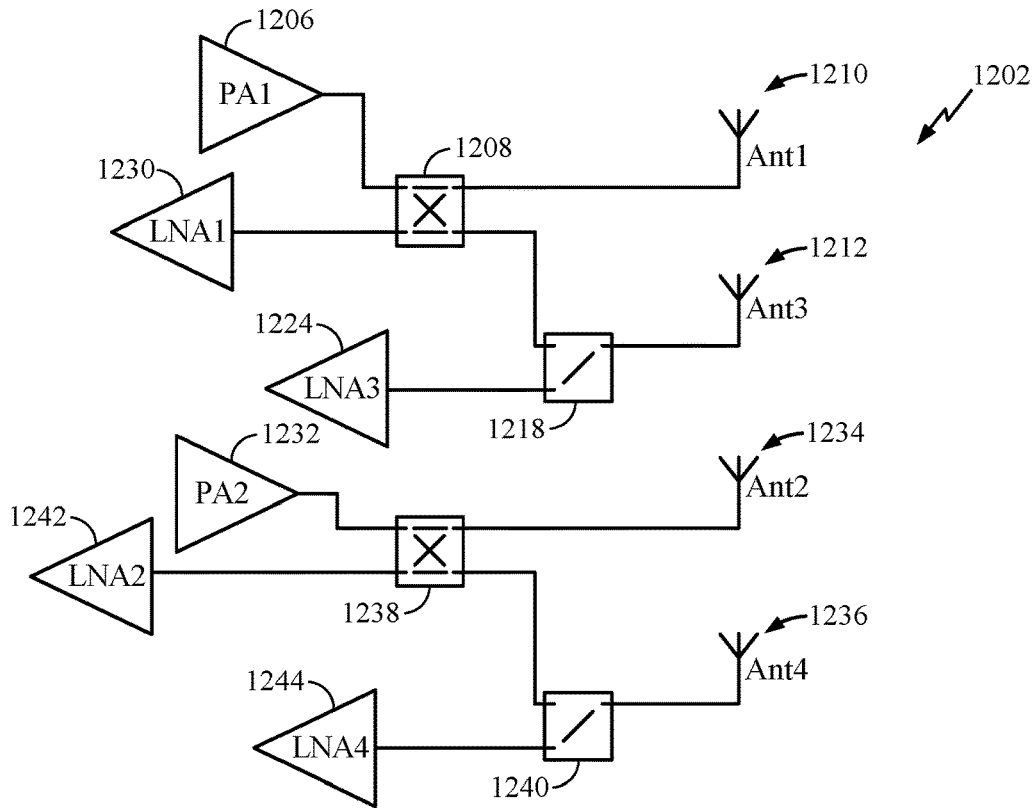
Figure 12C:
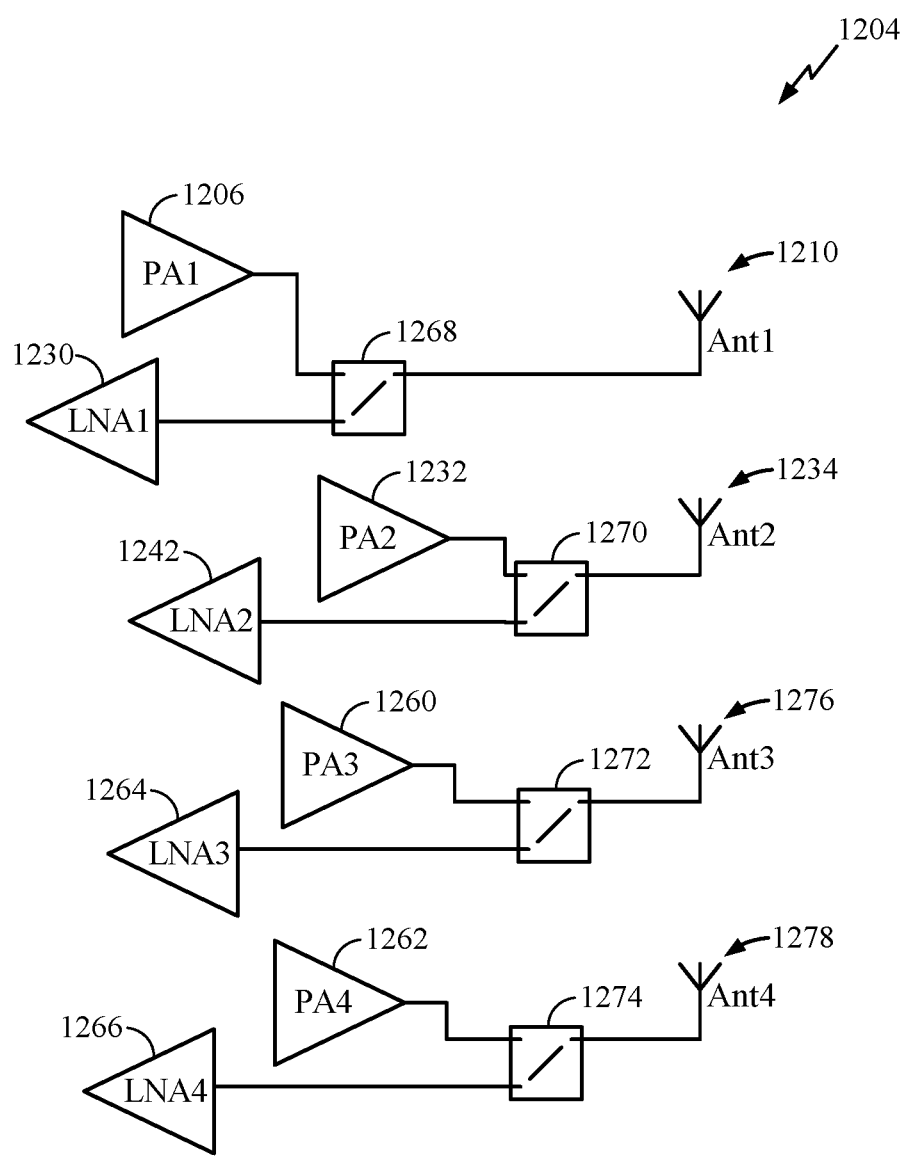

FIGS. 12A, 12B, and 12C illustrate different architectures of radio-frequency (RF) front-end circuitry 1200, 1202, 1204 having one, two, or four PAs, respectively, in accordance with certain aspects of the present disclosure. As illustrated, the RF front-end circuitry 1200 includes a single PA 1206 and is configured with switch circuitry 1208 (e.g., a duplexer) to allow for the output of the PA 1206 to be coupled to one of multiple antennas 1210, 1212, 1214, 1216, and moreover, to couple the antenna 1210 to the low-noise amplifier (LNA) 1230 during reception. For example, antennas 1210 may be designated for both uplink and downlink (hereinafter referred to a transmit (TX) antenna), and thus, may be in close proximity to the PA 1206 used to amplify signals for transmission. However, antennas 1212, 1214, 1216 may be receive (Rx) antennas designated for downlink communications, and thus, may not be in close proximity to any PA (e.g., PA 1206). PA 1206 may be used to transmit SRSs via the antennas 1212, 1214, 1216 using switches 1218, 1220, 1222, as illustrated. For example, switch circuitry 1208 may be configured to route a signal generated by the PA 1206 to one of the switches 1218, 1220, 1222. Each of the switches 1218, 1220, 1222 may be configured to route a signal from the switch circuitry 1208 to a respective one of the antennas 1212, 1214, 1216. The switches 1218, 1220, 1222 may also be configured to connect a respective one of the antennas 1212, 1214, 1216 to LNAs 1224, 1226, 1228 during reception. The RF circuitry 1200 may allow for a single SRS transmission via one of the antennas 1210, 1212, 1214, 1216 at any point in time, as described with respect to FIG. 10.

The RF front-end circuitry 1202 includes two PAs 1206, 1232. In this case, antennas 1210, 1234 may be TX antennas and antennas 1212, 1236 may be RX antennas. PA 1206 may be used for SRS transmissions using antennas 1210, 1212, and PA 1232 may be used for SRS transmissions using antennas 1234, 1236. For example, the PA 1232 may be coupled to switch circuitry 1238 (e.g., a duplexer) to allow for the output of the PA 1232 to be coupled to one of antennas 1234, 1236, through switch 1240. The switch circuitry 1238 and switch 1240 may be configured to connect respective one of antennas 1234, 1236 to a respective one of the LNAs 1242, 1244 during reception. The RF circuitry 1202 may allow for two SRS transmissions via two of the antennas (e.g., antennas 1212 and 1236) at any point in time, as described with respect to FIG. 11.

The RF front-end circuitry 1202 includes four PAs 1206, 1232, 1260, 1262, each coupled to a respective one of antennas 1210, 1234, 1276, 1278, through a respective one of switches 1268, 1270, 1272, 1274. The switches 1268, 1270, 1272, 1274 may also be configured to couple a respective one of the antennas 1210, 1234, 1276, 1278 to a respective one of the LNAs 1230, 1242, 1264, 1266 during reception, as illustrated. The RF circuitry 1204 may allow for four SRS transmissions via the antennas 1210, 1234, 1276, 1278 at any point in time.

In certain aspects of the present disclosure, multiple subbands may be sounded. In some cases, the time needed to switch between subbands may be 20 microseconds for bandwidth (BW) reconfiguration, plus 50-200 microseconds for retuning the local oscillator (LO) signal of the RF chain, and up to 900 microseconds for changing bands. However, these operations may be performed in parallel with the antenna switching, as previously described. One option for sounding multiple subbands is to configure the UE to wide bandwidth mode spanning the multiple bands. In this case, BW reconfiguration and LO retuning may not be needed if the UE supports the intended full frequency range for SRS configurations, and thus, the frame structures described with respect to protocols 1000 and 1100 may be used.

Certain aspects of the present disclosure provide protocols for transmission of SRSs for a UE that supports UL carrier-aggregation (CA). For inter-band CA (e.g., when component carriers (CCs) are in different bands), if the UE supports four receive antennas or UL MIMO for both bands simultaneously, SRS communication may be performed in accordance with the protocols 1000 or 1100 described with respect to FIGS. 10 and 11.

For intra-band contiguous UL CA (CCs in the same band), SRSs may not be treated independently for each CC. Many UEs are implemented with a single transmit (TX) chain that covers both CCs. Thus, if a first component carrier (CC1) is to be used for sounding other antenna ports, any transmissions of the second component carrier (CC2) may be stopped. If sounding is performed with the TX chain set up for CC1 only, then a BW reconfiguration and LO retuning time should be allowed before the SRS pattern can be started. For example, the TX chain may be configured to the first component carrier CC1 mode only, at which point the protocols 1000 and 1110 as described with respect to FIGS. 10 and 11 may be used for SRS transmissions. In some cases, SRS may be transmitted using the TX antenna (e.g., antenna 1210 in FIG. 12A) first, before configuring the TX chain to CC1 only for SRS transmissions using the RX antennas (e.g., antennas 1212, 1214, 1216 in FIG. 12A). These options may be performed for both intra-band contiguous and non-contiguous UL CA.

For intra-band UL CA cases, if the RF front-end architecture is implemented using a single PA (e.g., as described with respect to FIG. 12A), any transmission including a SRS on a primary cell (PCell) may be sent to the same antenna port as the secondary cell (SCell). If the UE supports UL CA and UL MIMO, two antenna ports may be sounded simultaneously, but all CCs may be sent to the same antenna ports.

For a UE that supports UL MIMO for UL CA, similar patterns for SRS transmissions as described with respect to protocols 1000 and 1100 may be applied for two the PA scenario as described herein if UL MIMO is configured. If not UL MIMO is not configured, then the network may configure UL MIMO before scheduling SRS transmissions or schedule single TX SRS pattern as described with respect to protocol 1000 of FIG. 10. In this case, one PA could be used for SRS transmissions and the other PA may be used for other transmissions on the other CC. However, for UL MIMO and for contiguous intra-band UL CA, the TX chains may share the same LO. Thus, even if the UE supports UL MIMO and UL CA, the UE may still be unable to send different signals to different antenna ports. If a UE has two TX LOs, then independent SRS and CC transmissions may be implemented.

Example Techniques for Power Control

Switching a PA to secondary or RX antennas involves using additional components or traces between the PA and the RX antennas, as descried herein, which results in additional losses from the PA to the corresponding antenna connectors. For example, the multi output switches described with respect to FIGS. 12A, 12B, and 12C may be configured for low insertion losses between the PA and primary TX antenna (e.g., from PA 1206 to antenna 1210 of FIG. 12A). However, the MIMO antennas (e.g., antennas 1214 and 1216 of FIG. 12A) may be placed further away from the PA and routing losses (cable, transmission lines, etc.) may be increased (e.g., up to 3 dB). It may be difficult to distinguish by standard which antennas will experience largest losses.

Certain aspects of the present disclosure provide techniques for controlling power of SRS transmissions. For example, in certain aspects, an offset parameter may be used to reduce the maximum output power of the SRS transmission (e.g., by 3 dB) when non-TX antenna(s) are sounded. In certain aspects, this parameter may be band dependent.

Figure 13:
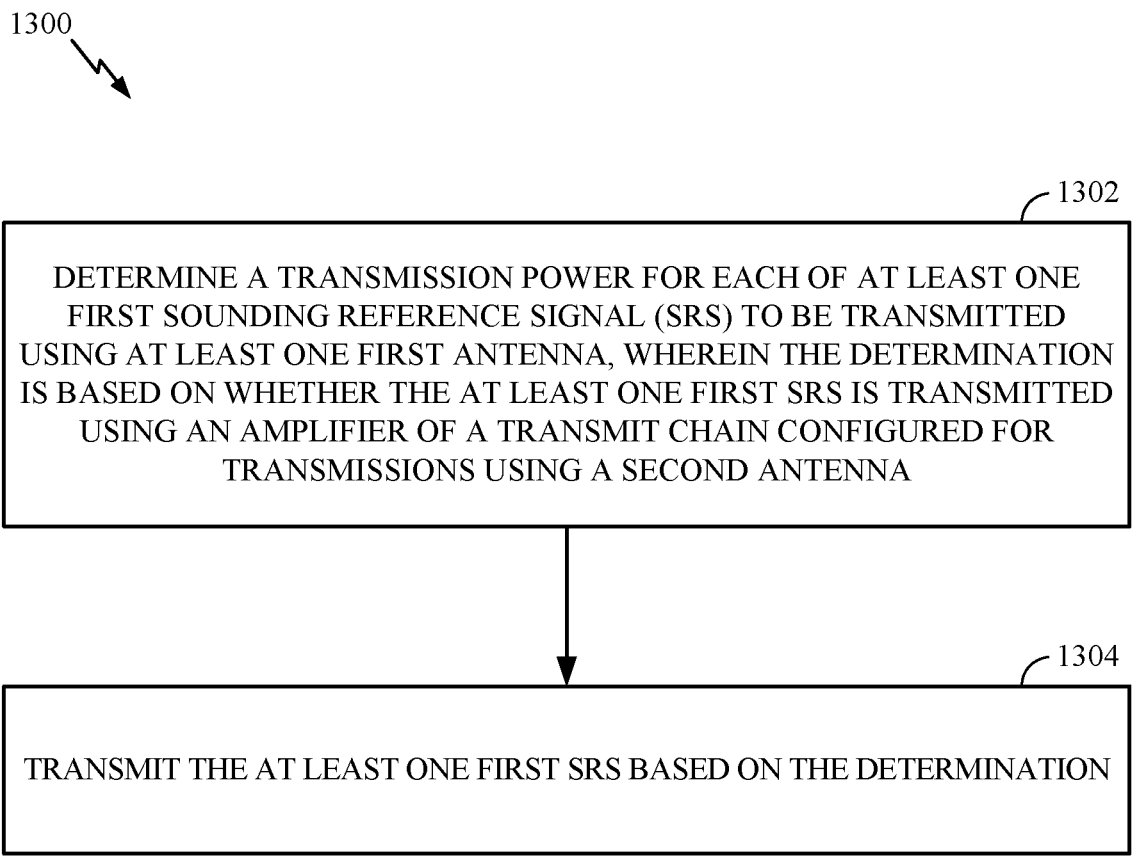
FIG. 13 illustrates example operations for power management by a UE, in accordance with aspects of the present disclosure.

FIG. 13 illustrates example operations 1300 for wireless communication, in accordance with certain aspects of the present disclosure. The operations 1300 may be performed by, for example, a UE such as the UE 120 of FIG. 1.

The operations 1300 begin, at block 1302, by determining a transmission power for each of at least one first SRS to be transmitted using at least one first antenna (e.g., RX antennas such as antennas 1214 and 1216 of FIG. 12A). In this case, the determination may be based on whether the at least one first SRS is transmitted using an amplifier (e.g., PA 1206) of a transmit chain configured for transmissions using a second antenna (e.g., a TX antenna such as antenna 1210 of FIG. 12A). At block 1304, the UE may transmit the at least one first SRS based on the determination.

The maximum output power ($P_{CMAX\_L,c}$) for the SRS transmission may be calculated using the following equation:

$$P_{CMAX\_L,c} = \text{MIN}\{P_{EMAX,c} - \Delta T_{C,c}, (P_{PowerClass} - \Delta P_{PowerClass}) - \text{MAX}(MPR_c + A\text{-}MPR_c + \Delta T_{IB,c} + \Delta T_{C,c} + \Delta T_{ProSe} + \Delta T_{RxSRS}, P\text{-}MPR_c)\}$$

where $P_{EMAX,c}$ is the maximum allowable uplink emission power as set by the network, $P_{PowerClass}$ is the maximum RF output power of the UE (dBm) according to the UE power class, $\Delta P_{PowerClass}$ is an offset to the maximum RF output power that may be set by the UE, $MPR_c$ is the maximum power reduction (MPR), A-$MPR_c$ is additional-MPR that may be set by the UE, P-$MPR_c$ is a power management term set by the UE (e.g., to ensure compliance with applicable electromagnetic absorption requirements), $\Delta T_{C,c}$ is the allowed operating band edge transmission power relaxation, $\Delta T_{IB,c}$ is the allowed maximum configured output power relaxation due to support for inter-band CA operation, and $\Delta T_{ProSe}$ is the allowed operating band transmission power relaxation due to support of E-UTRA proximity services on an operating band.

Certain aspects of the present disclosure provide an additional parameter $\Delta_{TRxSRS}$ that may be set to adjust (e.g., relax) the maximum output power setting to account for losses due to sounding on a non-TX antenna(s). In certain aspects, $\Delta T_{RxSRS}$ may be set to 3 dB and may be applied when the UE transmits SRS to antenna ports designated as Rx ports (e.g., antennas 1214 and 1216 of FIG. 12A).

In some cases, the UE may know the additional loss from the PA to the RX antenna ports since this loss may be design dependent. Thus, in certain aspects of the present disclosure, the UE may compensates for the additional loss at lower power levels and aim to deliver SRSs to all antennas ports with equal power. For example, referring back to FIG. 12A, PA 1206 may be configured to transmit SRSs via antennas 1210, 1212, 1214, and 1216 with the same power by compensating for the power loss differences between the routing of signals from the PA 1206 to each of the antennas 1210, 1212, 1214, and 1216. However, compensating for the additional power loss may only be possible until a maximum power capability of the PA 1206 is reached, at which point, the power of SRSs may begin to differ.

In other cases, the UE may maintain the same power difference between antennas as indicated by the maximum power capability reduction throughout the entire power range of the PA 1206. For example, referring back to FIG. 12A, PA 1206 may be configured to transmit SRSs using the Rx antennas (e.g., antennas 1212, 1214, and 1216) at 3 dB lower power as compared to an SRS transmitted using the TX antenna (e.g., antenna 1210).

Not all UEs may be capable of compensating for the power loss and some networks may prefer different behaviors. Therefore, certain aspects of the present disclosure are directed to techniques for a network to determine whether a UE is capable of compensation for the power loss and indicate to the UE if the network prefers for the UE to compensate for the SRS power and allow degradation only when the maximum power is reached, or if the network prefers for the UE to maintain the same power difference between antennas regardless of the power level until a maximum power is reached.

Figure 14:
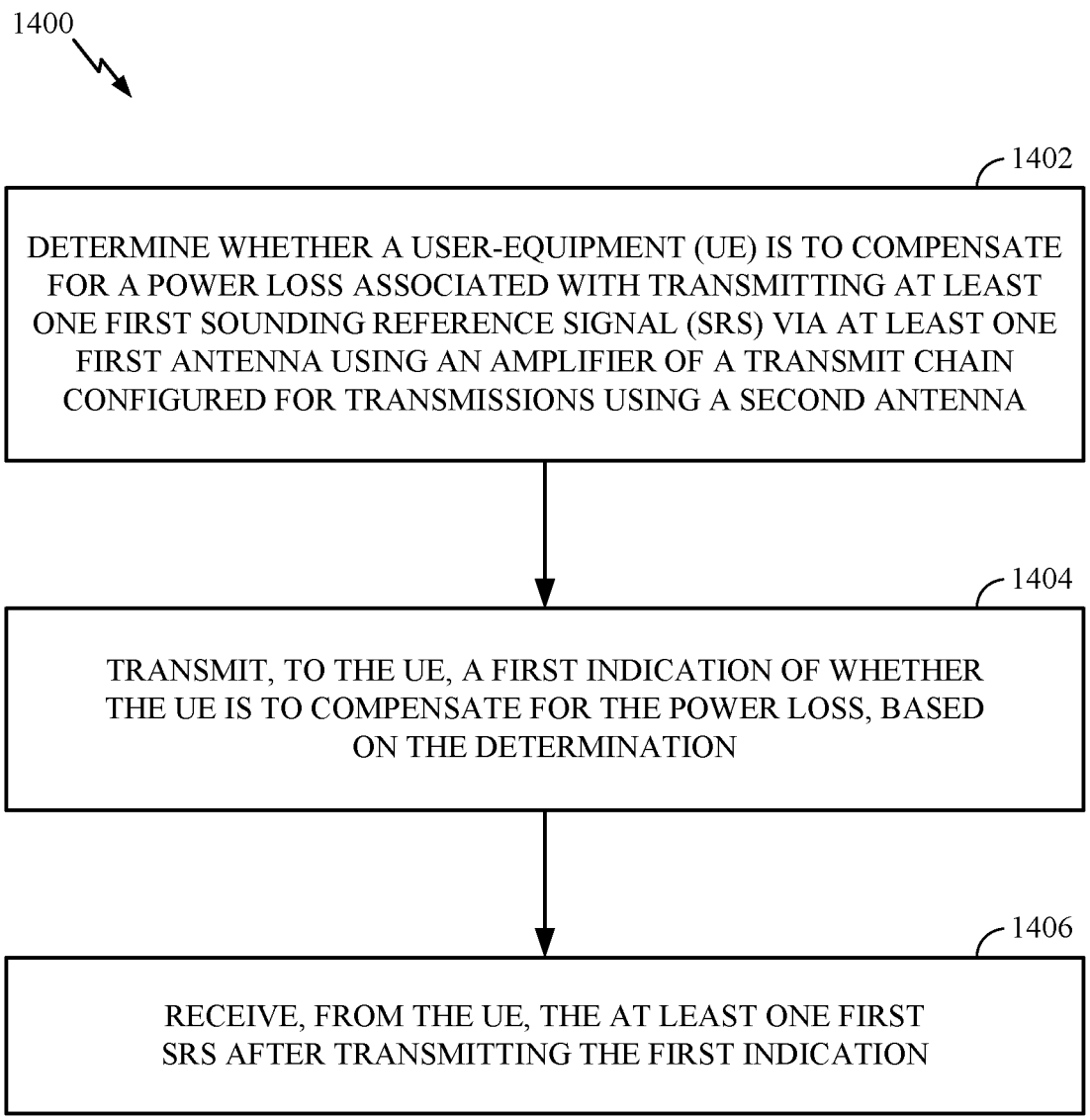
FIG. 14 illustrates example operations for power management by a BS, in accordance with aspects of the present disclosure.

FIG. 14 illustrates example operations 1400 for wireless communication, in accordance with certain aspects of the present disclosure. The operations 1400 may be performed by, for example, a network entity such as the BS 110 of FIG. 1.

The operations 1400 begin, at block 1402, by determining whether a UE is to compensate for a power loss associated with transmitting at least one first SRS via at least one first antenna (e.g., antenna 1212) using an amplifier (e.g., PA 1206) of a transmit chain configured for transmissions using a second antenna (e.g., antenna 1210). At block 1404, the network entity may transmit, to the UE, a first indication of whether the UE is to compensate for the power loss, based on the determination, and at block 1406, receive, from the UE, the at least one first SRS after transmitting the first indication. In certain aspects, the network entity may receive, from the UE, a second indication of whether the UE is capable of compensating for the power loss. In this case, the determination at block 1402 may be based on the second indication.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   determining a transmission power for each of at least one first sounding reference signal (SRS) to be transmitted using at least one first antenna, wherein the determination is based on whether a routing configuration of a user-equipment (UE) is used to transmit the at least one first SRS using an amplifier of a transmit chain selectively configured to transmit using a second antenna or the at least one first antenna, the routing configuration of the UE being used to transmit the at least one first SRS and a second SRS using different symbols of a slot, wherein the determination comprises determining that the UE is to maintain a transmission power offset associated with a power loss associated with the routing configuration throughout a power range of the amplifier when transmitting the at least one first SRS; and
   transmitting the at least one first SRS based on the determination.

2. The method of claim 1, wherein the at least one first antenna is designated for downlink communications, and the second antenna is designated for uplink communications.

3. The method of claim 1, wherein the determination comprises determining whether to:
   compensate for the power loss until a transmit power limit is reached when transmitting the at least one first SRS; or maintain the transmission power offset associated with the power loss throughout the power range of the amplifier when transmitting the at least one first SRS.

4. The method of claim 3, further comprising transmitting the second SRS via the second antenna, wherein:
   the compensating comprises compensating for the power loss such that the transmission power of the at least one first SRS is the same as a transmission power of the second SRS until the transmit power limit is reached.

5. The method of claim 3, further comprising transmitting the second SRS via the second antenna, wherein:
   the maintaining comprises maintaining the transmission power offset such that the transmission power of the at least one first SRS is less than a transmission power of the second SRS by the transmission power offset.

6. The method of claim 1, further comprising:
   receiving, from a network entity, an indication that the UE is to maintain the transmission power offset throughout the power range of the amplifier.

7. The method of claim 1, wherein the power loss is associated with one or more components used to couple an output of the amplifier with the at least one first antenna.

8. A method for wireless communication, comprising:
   determining whether a user-equipment (UE) is to compensate for a power loss associated with a routing configuration used to transmit at least one first sounding reference signal (SRS) via at least one first antenna using an amplifier of a transmit chain selectively configured to transmit using a second antenna or the at least one first antenna, wherein the routing configuration of the UE is used to transmit the at least one first SRS and a second SRS using different symbols of a slot, wherein the determination comprises determining that the UE is to maintain a transmission power offset associated with the power loss throughout a power range of the amplifier when transmitting the at least one first SRS;
   transmitting, to the UE, a first indication that the UE is to maintain the transmission power offset throughout the power range of the amplifier, based on the determination; and
   receiving, from the UE, the at least one first SRS after transmitting the first indication.

9. The method of claim 8, further comprising:
   receiving, from the UE, a second indication of whether the UE is capable of compensating for the power loss, wherein the determination is based on the second indication.

10. The method of claim 8, wherein the at least one first antenna is designated for downlink communications, and the second antenna is designated for uplink communications.

11. The method of claim 8, wherein the power loss is associated with one or more components used to couple an output of the amplifier with the at least one first antenna.

12. An apparatus for wireless communication, comprising:
    a processing system configured to determine a transmission power for each of at least one first sounding reference signal (SRS) to be transmitted using at least one first antenna, wherein the determination is based on whether a routing configuration of a user-equipment (UE) is used to transmit the at least one first SRS using an amplifier of a transmit chain selectively configured to transmit using a second antenna or the at least one first antenna, the routing configuration of the UE being used to transmit the at least one first SRS and a second SRS using different symbols of a slot, wherein the determination comprises determining that the UE is to maintain a transmission power offset associated with a power loss associated with the routing configuration throughout a power range of the amplifier when transmitting the at least one first SRS; and
    a transmitter configured to transmit the at least one first SRS based on the determination.

13. An apparatus for wireless communication, comprising:
    a processing system configured to determine whether a user-equipment (UE) is to compensate for a power loss associated with a routing configuration used to transmit at least one first sounding reference signal (SRS) via at least one first antenna using an amplifier of a transmit chain selectively configured to transmit using a second antenna or the at least one first antenna, wherein the routing configuration of the UE is used to transmit the at least one first SRS and a second SRS using different symbols of a slot, wherein the determination comprises determining that the UE is to maintain a transmission power offset associated with the power loss throughout a power range of the amplifier when transmitting the at least one first SRS;
    a transmitter configured to transmit, to the UE, a first indication that the UE is to maintain the transmission power offset throughout the power range of the amplifier, based on the determination; and
a receiver configured to receive, from the UE, the at least one first SRS after transmitting the first indication.

14. An apparatus for wireless communication, comprising:
means for determining a transmission power for each of at least one first sounding reference signal (SRS) to be transmitted using at least one first antenna, wherein the determination is based on whether a routing configuration of a user-equipment (UE) is used to transmit the at least one first SRS using an amplifier of a transmit chain selectively configured to transmit using a second antenna or the at least one first antenna, the routing configuration of the UE being used to transmit the at least one first SRS and a second SRS using different symbols of a slot, wherein the means for determining comprises means for determining that the UE is to maintain a transmission power offset associated with a power loss associated with the routing configuration throughout a power range of the amplifier when transmitting the at least one first SRS; and
means for transmitting the at least one first SRS based on the determination.

15. An apparatus for wireless communication, comprising:
means for determining whether a user-equipment (UE) is to compensate for a power loss associated with a routing configuration used to transmit at least one first sounding reference signal (SRS) via at least one first antenna using an amplifier of a transmit chain selectively configured to transmit using a second antenna or the at least one first antenna, wherein the routing configuration of the UE is used to transmit the at least one first SRS and a second SRS using different symbols of a slot, wherein the determination comprises determining that the UE is to maintain a transmission power offset associated with the power loss throughout a power range of the amplifier when transmitting the at least one first SRS;
means for transmitting, to the UE, a first indication that the UE is to maintain the transmission power offset throughout the power range of the amplifier, based on the determination; and
means for receiving, from the UE, the at least one first SRS after transmitting the first indication.

16. A non-transitory computer-readable medium having instructions stored thereon for:
determining a transmission power for each of at least one first sounding reference signal (SRS) to be transmitted using at least one first antenna, wherein the determination is based on whether a routing configuration of a user-equipment (UE) is used to transmit the at least one first SRS using an amplifier of a transmit chain selectively configured to transmit using a second antenna or the at least one first antenna, the routing configuration of the UE being used to transmit the at least one first SRS and a second SRS using different symbols of a slot, wherein the determination comprises determining that the UE is to maintain a transmission power offset associated with a power loss associated with the routing configuration throughout a power range of the amplifier when transmitting the at least one first SRS; and
transmitting the at least one first SRS based on the determination.

17. A non-transitory computer-readable medium having instructions stored thereon for:
determining whether a user-equipment (UE) is to compensate for a power loss associated with a routing configuration used to transmit at least one first sounding reference signal (SRS) via at least one first antenna using an amplifier of a transmit chain selectively configured to transmit using a second antenna or the at least one first antenna, wherein the routing configuration of the UE is used to transmit the at least one first SRS and a second SRS using different symbols of a slot, wherein the determination comprises determining that the UE is to maintain a transmission power offset associated with the power loss throughout a power range of the amplifier when transmitting the at least one first SRS;
transmitting, to the UE, a first indication that the UE is to maintain the transmission power offset throughout the power range of the amplifier, based on the determination; and
receiving, from the UE, the at least one first SRS after transmitting the first indication.

* * * * *